United States Patent [19]

Gilmour

[11] Patent Number: 5,412,618
[45] Date of Patent: May 2, 1995

[54] SPOTLIGHT-MODE SYNTHETIC APERTURE SIDE-LOOK SONAR

[75] Inventor: George A. Gilmour, Severna Park, Md.

[73] Assignee: Westinghouse Electric Corporation, Pittsburgh, Pa.

[21] Appl. No.: 224,375

[22] Filed: Apr. 7, 1994

[51] Int. Cl.⁶ .............................................. G01S 15/89
[52] U.S. Cl. ........................................ 367/88; 367/104
[58] Field of Search ................... 367/88, 104, 120, 138

[56] References Cited

U.S. PATENT DOCUMENTS

| | | | |
|---|---|---|---|
| 4,802,148 | 1/1989 | Gilmour | 367/88 |
| 4,970,700 | 11/1990 | Gilmour et al. | 367/88 |

Primary Examiner—Daniel T. Pihulic

[57] ABSTRACT

A side-look sonar system and method apply a spotlight-mode synthetic aperture technique to provide increased image resolution and a long receive aperture. A control circuit activates mechanical drives to rotate projecting and receiving sonar transducers as the carrier vehicle on which the transducers are mounted moves relative to a target. The mechanical drives rotate the transducers as a function of the rate of movement of the carrier vehicle to direct receiving and projecting surfaces of the transducers at the target for an extended period of time. An image processor uses conventional beamforming techniques to form a high resolution image of the target based on the acoustic energy samples acquired by the receiving transducer.

26 Claims, 5 Drawing Sheets

SPOTLIGHT-MODE SYNTHETIC APERTURE SIDE-LOOK SONAR

BACKGROUND OF THE INVENTION

1. Field of the Invention

The present invention relates to side-look sonar systems, and more particularly to high resolution side-look sonar systems.

2. Description of Related Art

In a side-look sonar system, a sonar transducer transported by an underwater carrier vehicle projects pulses of acoustic energy laterally as the carrier vehicle moves relative to a target area. A beam of acoustic energy is reflected back from the target area and received by the receiving surface of a receiver transducer mounted on the side of the carrier vehicle. The side-look sonar system includes circuitry for processing the received acoustic energy to form an image of the target area on a display device. The displayed image consists of a pattern of highlights and shadows outlined to permit identification of the target area.

An increased demand for automatic target detection in side-look sonar systems has led to a need for extremely high resolution systems capable of providing precise target classification. For increased resolution, there have been developed side-look sonar systems that use a curved transducer formed by transducer segments arranged along the arc of a circle. In such a system, the curved transducer serves to focus acoustic energy reflected from the target area. Although the focused transducer may increase resolution, the acoustic energy is focused in a very small aperture.

High resolution can also be achieved in a side-look sonar system by extending the length of the transducer in a straight line. A longer transducer provides an increased receive aperture. However, practical limits on transducer length dictate that longer transducers be formed by a linear array of transducer segments. An excessive number of transducer segments undesirably complicates the system by necessitating additional processing channels. The increased size of a longer transducer also may lead to destabilization of the carrier vehicle. Moreover, acoustic energy having a curved wavefront may generate an unacceptable phase differential between individual transducer segments in the linear array.

SUMMARY OF THE INVENTION

In light of the foregoing, the present invention is directed to a spotlight-mode synthetic aperture side-look sonar system and method providing increased resolution and a long receive aperture.

Additional features and advantages of the invention will be set forth in part in the description that follows, and in part will be apparent from the description, or may be learned by practice of the invention. The objects and advantages of the invention will be realized and attained by the system and method particularly pointed out in the written description and claims hereof, as well as in the appended drawings.

To achieve the advantages of the invention and in accordance with the purpose of the invention, as embodied and broadly described herein, the present invention is a side-look sonar system comprising a receiving sonar transducer having a receiving surface for receiving acoustic energy reflected from a target area, a mechanical drive for rotating the receiving sonar transducer, and a control circuit for controlling the rotation of the receiving sonar transducer by the mechanical drive to direct the receiving surface of the receiving sonar transducer toward the target area as the receiving sonar transducer moves relative to the target area.

In another aspect, the present invention is a method for providing a synthetic aperture in a side-look sonar system having a receiving sonar transducer that includes a receiving surface for receiving acoustic energy reflected from a target area, the method comprising the steps of rotating the receiving sonar transducer, and controlling the rotation of the receiving sonar transducer to direct the receiving surface of the receiving sonar transducer toward the target area as the receiving sonar transducer moves relative to the target area.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, illustrate the embodiments of the invention and together with the description serve to explain the principles of the invention.

DETAILED DESCRIPTION OF THE INVENTION

Reference will now be made in detail to the present preferred embodiment of the invention, examples of which are illustrated in the accompanying drawings. Wherever possible, the same reference numbers will be used throughout the drawings to refer to the same or like parts.

In accordance with the present invention, there is provided a spotlight-mode synthetic aperture side-look sonar system comprising a receiving sonar transducer, a mechanical drive for rotating the receiving sonar transducer, and a control circuit for controlling the rotation of the receiving sonar transducer by the mechanical drive. There is also provided, in accordance with the present invention, a method for providing a spotlight-mode synthetic aperture in a side-look sonar system.

The spotlight-mode synthetic aperture side-look sonar system and method of the present invention apply a synthetic aperture technique to increase the resolution and receive aperture of a receiving sonar transducer for enhanced target classification. The synthetic aperture technique simulates the effect of an extremely long receiving transducer by providing a spotlight mode in which a relatively small transducer is trained on a target area for an extended period of time. The transducer is rotated to sequentially approximate the spatial positions of individual transducer elements that would be provided in a longer transducer, thereby providing a synthetic aperture. The acoustic energy sampled at each position is stored and then processed to generate an image of the target area.

Figure 1:
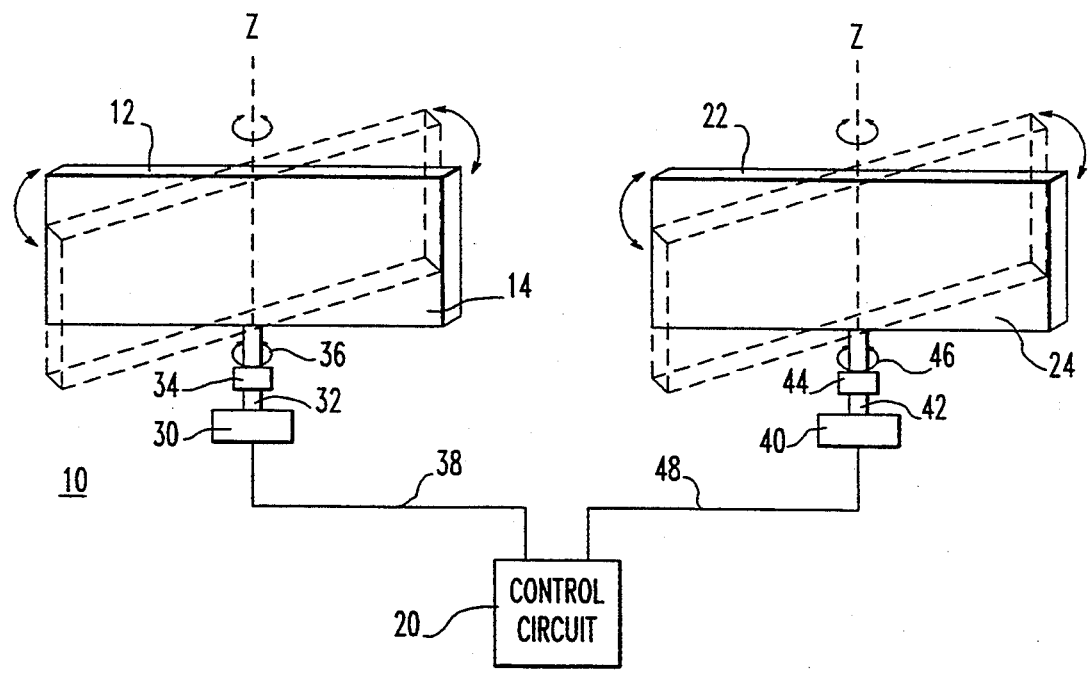
FIG. 1 illustrates one embodiment of the spotlight-mode synthetic aperture side-look sonar system of the present invention.
Figure 2:
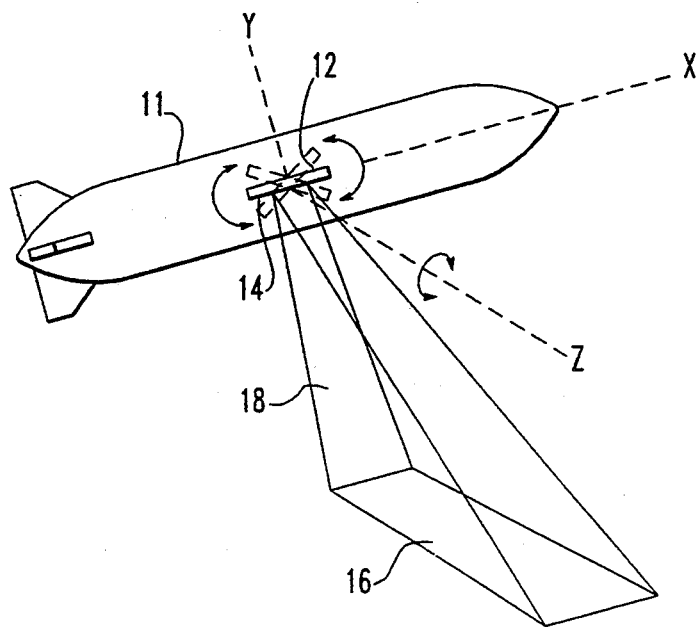
FIG. 2 is a perspective view of an underwater carrier vehicle equipped with a spotlight-mode synthetic aperture side-look sonar system, in accordance with the present invention.

An exemplary embodiment of the spotlight-mode synthetic aperture side-look sonar system of the present invention is shown in FIG. 1, and designated generally by reference numeral 10. As herein embodied and shown in FIG. 1, the system 10 includes a receiving sonar transducer 12 having a receiving surface 14. For sonar mapping, receiving transducer 12 is mounted on a search platform, such as the underwater carrier vehicle 11 shown in FIG. 2, which may be self-propelled or towed by a surface vessel. A projecting sonar transducer 22, which would also be mounted on the carrier vehicle 11, has a projecting surface 24 that projects acoustic energy toward a target area. In some cases, the receiving and projecting transducers 12, 22 can be realized by the same sonar transducer, with the use of appropriate T/R switching. The target area, designated in FIG. 2 by reference numeral 16, reflects a wave 18 of acoustic energy that is received by the receiving surface 14 of the receiving transducer 12, and processed by receive circuitry to form an image of the target.

As the carrier vehicle 11 moves relative to the target area 16, a mechanical drive rotates the projecting transducer 22 about an axis "z", in a vertical plane parallel to the sideplane of the carrier vehicle 11, to train the projecting surface 24 of transducer 22 on the target area for an extended period of time. In this manner, the projecting transducer 22 keeps the target area "insonified" during the travel of the carrier vehicle 11. The mechanical drive is formed by a motor 40 having a drive shaft 42 coupled, via collar 44, to a mounting shaft 46 on the projecting transducer 22. The motor 40 may be, for example, a DC stepper motor capable of rotating the transducer 12 in discrete increments in response to excitation signals. An additional mechanical drive rotates the receiving transducer 12 in the vertical plane, about the "z" axis, according to synthetic aperture principles, to provide a spotlight mode in which the receiving surface 14 of transducer 12 is continuously trained on the insonified target area 16, thereby increasing the receive aperture. This additional mechanical drive is formed by a motor 30 having a drive shaft 32 coupled, via collar 34, to a mounting shaft 36 on the receiving transducer 12. For purposes of this exemplary embodiment, it is conceived that the "z" axes, about which the receiving and projecting transducers 12, 22 are rotated, would be substantially perpendicular to the side plane of the carrier vehicle defined by the "x" and "y" axes, and substantially parallel to a bottom plane of the carrier vehicle.

The system 10 also includes a control circuit 20 that controls the rotation of transducers 12 and 22 by the mechanical drives. As the carrier vehicle travels along its search path, the control circuit 20 continuously senses the acoustic energy received by receiving transducer 12. When the control circuit 20 senses a level or quality of acoustic energy indicating the presence of a target in the target area, it activates the mechanical drives. As an example, the control circuit 20 may detect the target based on target detection software executed by a processor (not shown) associated with the control circuit. Alternatively, a sonar operator could direct the control circuit 20 to activate the mechanical drives, on the basis of visual target identification on an image display. In either case, the control circuit 20 activates the mechanical drives, in response to a target detection, to rotate transducers 12 and 22 according to synthetic aperture principles to provide a spotlight mode of operation.

For example, to keep the target insonified during movement of the carrier vehicle, the control circuit 20 transmits excitation signals, via line 48, to motor 40. The excitation signals control the direction and degree of rotation of the projecting transducer 22 by motor 40 such that the projecting surface 24 of transducer 22 remains directed at the target area as the carrier vehicle 11 moves. Similarly, the control circuit 20 transmits excitation signals to motor 30, via line 38, to control the direction and degree of rotation of the receiving transducer 12. The control circuit 20 adjusts the degree of rotation of the projecting and receiving transducers 12, 22 as a function of the rate of movement of the carrier vehicle. Hence, the receiving surface 14 of receiving transducer 12 remains directed toward the target area during travel, creating a longer receive aperture.

Figure 3:
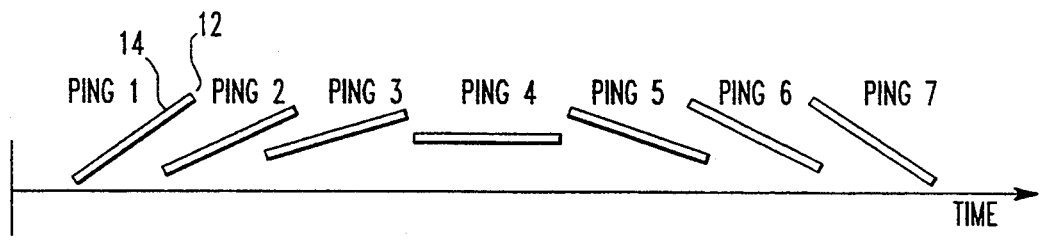
FIG. 3 is a timing diagram illustrating rotation of the receiving and projecting transducers of the spotlight-mode synthetic aperture side-look sonar system shown in FIG. 1, in accordance with the present invention.

With reference to the timing diagram shown in FIG. 3, the receiving transducer 12 and projecting transducer 22 initially may be oriented such that the respective receiving and projecting surfaces 14, 24 look somewhat forward, relative to a direction of movement of the carrier vehicle 11, as indicated by "Ping 1." This somewhat forward-looking transducer orientation enables the control circuit 20 to detect a target in advance of a lateral detection. When the control circuit 20 senses a target, it activates motors 30 and 40 to rotate the receiving and projector transducers 12 and 22, respectively, in discrete increments, represented by "Ping 2" through "Ping 7." Thus, the transducers 12 and 22 remain trained on the target to provide a spotlight mode as the carrier vehicle 11 passes by the target area 16. After the transducers 12 and 22 have been rotated to a somewhat backward-looking position, represented by "Ping 7," and the target is beyond a useful range of reception, the control circuit 20 controls motors 30 and 40 to reset transducers 12 and 22, respectively, to the "Ping 1" position for the acquisition of a new target. It is noted that "Ping 1" through "Ping 7" do not necessarily represent successive increments of rotation of transducer 12. Rather, transducer 12 may be rotated in very small increments to provide many discrete target samples.

Figure 4:
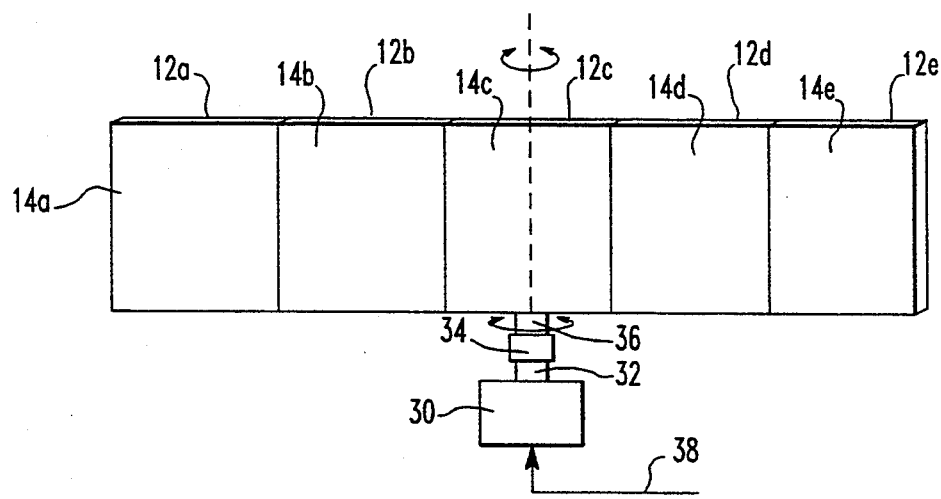
FIG. 4 illustrates a second embodiment of the spotlight-mode synthetic aperture side-look sonar system of the present invention.
Figure 5:
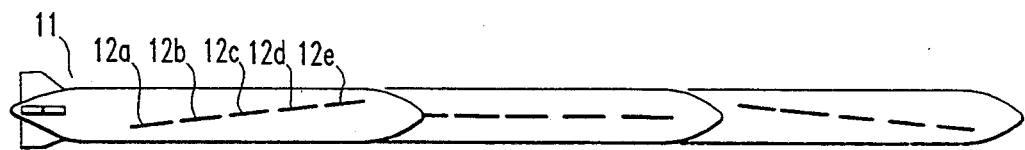
FIG. 5 illustrates movement of an underwater carrier vehicle equipped with the spotlight-mode synthetic aperture side-look sonar system shown in FIG. 4, in accordance with the present invention.

In FIG. 1, the receiving transducer was represented by a single sonar transducer 12. As herein embodied and shown in FIG. 4, however, a second embodiment of the spotlight-mode synthetic aperture side-look sonar system of the present invention employs a composite sonar transducer formed by coupling a plurality of sonar transducers 12a–12e to one another. The respective receiving surfaces 14a–14b of the sonar transducers 12a–12e are oriented substantially parallel to one another to form a straight-line transducer having a relatively long receive aperture. The receive aperture of the composite sonar transducer 12a–12e is further increased by applying the synthetic aperture principles of the present invention. For example, the drive shaft 32 of motor 30 may be coupled, by collar 34, to a mounting shaft 36 of the central transducer 14c, to form a mechanical drive. The control circuit 20 senses the acoustic energy received by the sonar transducers 12a–12e that form the composite sonar transducer, and, in response to detection of a target, activates the mechanical drive to rotate the entire composite sonar transducer about the "z" axis. As a result, the respective receiving surfaces 14a–14e are continuously trained on the target in a spotlight mode to provide a set of samples for each "ping." FIG. 5 illustrates the rotation of the composite transducer 12a–12e in the spotlight-mode synthetic aperture side-look sonar system shown in FIG. 4, during movement of underwater carrier vehicle 11.

Figure 6:
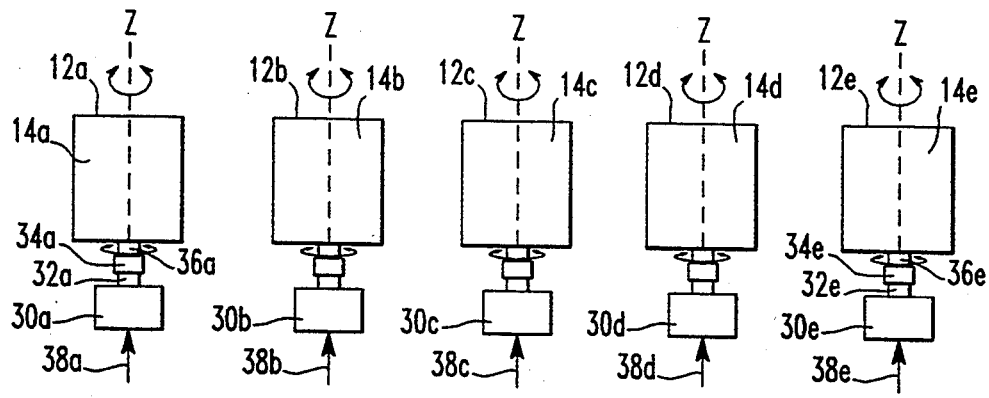
FIG. 6 illustrates a third embodiment of the spotlight-mode synthetic aperture side-look sonar system of the present invention.

As herein embodied and shown in FIG. 6, a third embodiment of the spotlight-mode synthetic aperture side-look sonar system of the present invention employs a receiving sonar transducer formed by a plurality of discrete sonar transducers 12a–12e. If the straight-line composite sonar transducer shown in FIG. 4 is excessively long, it may undesirably protrude from the carrier vehicle 11 when rotated, causing destabilization. In contrast, the discrete transducers 12a–12e of transducer 50, shown in FIG. 4, are individually rotated about the "z" axis to provide a spotlight-mode synthetic aperture. Thus, the degree of protrusion of the discrete transducers 12a–12e may be much less than that of the composite transducer during rotation. The mechanical drive that rotates the discrete transducers 12a–12e comprises a plurality of individual drive units having motors 30a–30e. Each of the motors 30a–30e has a drive shaft 32a–32e coupled to the mounting shaft 36a–36e of a respective transducer by collars 34a–34e. The control circuit 20 detects a target by sensing the acoustic energy received by the discrete sonar transducers 12a–12e. After a target is detected, the control circuit 20 activates the drive units by applying excitation signals to the individual motors 30a–30e, via lines 38a–38e. The drive units then rotate transducers 12a–12e, as a function of the rate of movement of the carrier vehicle, to direct the respective receiving surfaces 14a–14e toward the target. Although it is preferred that the discrete transducers 12a–12e be rotated in unison at the same rate to achieve a "venetian blind" effect, they conceivably could be rotated at different rates to vary the focus of the receiving transducer assembly.

Figure 7:
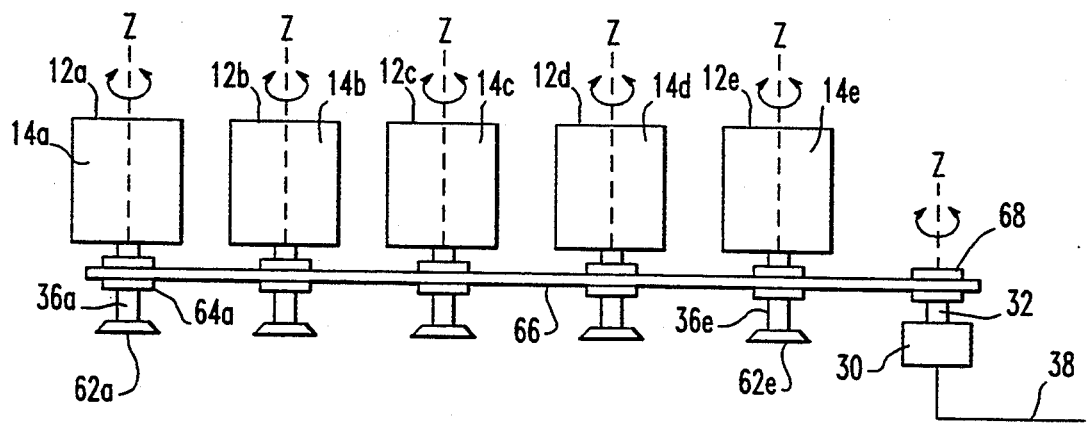
FIG. 7 illustrates a fourth embodiment of the spotlight-mode synthetic aperture side-look sonar system of the present invention.
Figure 8:
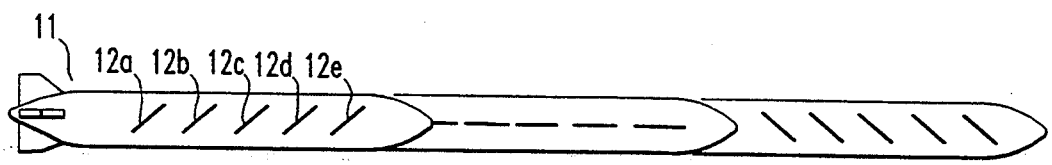
FIG. 8 illustrates movement of an underwater carrier vehicle equipped with either of the spotlight-mode synthetic aperture side-look sonar systems shown in FIGS. 6 and 7, in accordance with the present invention.
Figure 9:
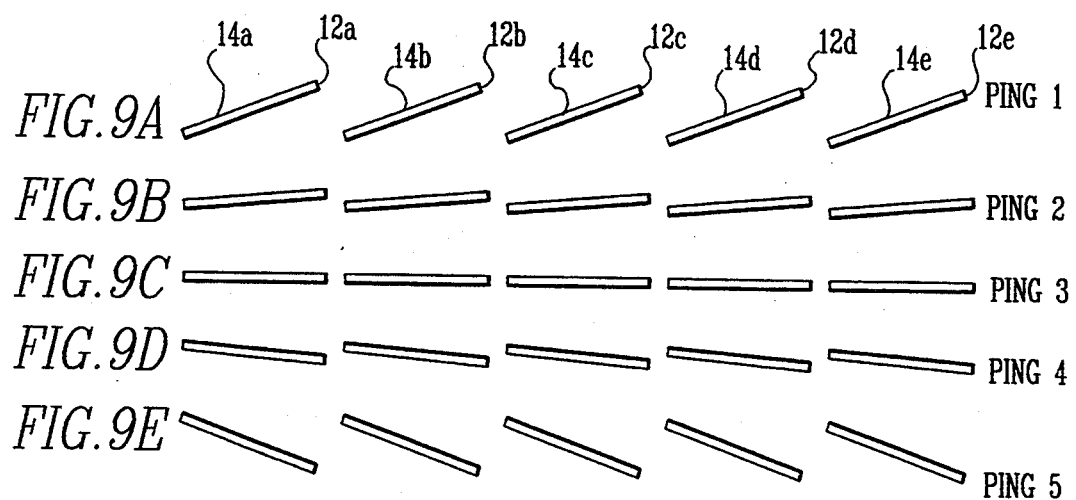
FIGS. 9A–9E are timing diagrams illustrating rotation of the receiving transducers of the spotlight-mode synthetic aperture side-look sonar systems shown in FIGS. 5 and 6, in accordance with the present invention.

As herein embodied and shown in FIG. 7, a fourth embodiment of the spotlight-mode synthetic aperture side-look sonar system of the present invention employs a receiving transducer formed by a plurality of discrete sonar transducers 12a–12e driven by a common mechanical drive. As in the embodiment shown in FIG. 6, each of the discrete sonar transducers 12a–12e has a respective mounting shaft 36a–36e. In contrast to the individual drive units shown in FIG. 6, however, the mechanical drive includes a drive belt 66 coupled to each of the respective mounting shafts 36a–36e, wherein motor 30 drives the drive belt 66 to rotate each of the receiving sonar transducers 12a–12e at the same time and rate. The mounting shafts 36a–36e of transducers 12a–12e may be placed in respective pivot mounts 62a–62e, and equipped with gears 64a–64e that engage belt 66. The drive belt 66 also engages a gear 68 provided on the drive shaft 32 of motor 30. Drive belt 66 may be integrally formed by any of a number of suitable materials, such as rubber or nylon, or could be in the form of a linked, chain-type belt. When the control circuit 20 detects a target, it activates motor 30 with an excitation signal transmitted on line 38. The motor 30 then drives belt 66 to rotate the discrete sonar transducers 12a–12e as a function of the rate of movement of the carrier vehicle, thereby directing the respective receiving surfaces 14a–14e of the transducers toward the target to generate a spotlight mode of operation. FIG. 8 illustrates the "venetian blind" effect of rotating the discrete transducers 12a–12b in either of the spotlight-mode synthetic aperture side-look sonar systems shown in FIGS. 6 and 7, during movement of the carrier vehicle 11 relative to a target.

FIGS. 9A–9E are timing diagrams illustrating the rotation of transducers 12a–12e, shown in FIGS. 6 and 7, over time as the carrier vehicle 11 passes a target. At an initial time, the receiving transducers 12a–12e may be skewed such that the receiving surfaces 14a–14e look forward, relative to a direction of movement of the carrier vehicle, as indicated by "Ping 1," to aid in advance target detection. When the control circuit 20 senses a target, it activates the mechanical drive to rotate receiving transducers 12a–12e, in discrete increments, represented by "Ping 2" through "Ping 5." The transducers 12a–12e consequently are rotated to give the "venetian blind" effect, such that the receiving surfaces 14a–14e remain trained on the target for an extended period of time to provide a spotlight-mode synthetic aperture. When the transducers 12a–12e have been rotated to a backward-looking position, represented by "Ping 5," the control circuit 20 controls rotation by the mechanical drive to reset transducers 12a–12e to the initial forward-looking position designated by "Ping 1." In FIGS. 6–8 and 9A–9E, the receiving sonar transducer is represented, for purposes of example, as having five individual transducers 12a–12e. It is noted, however, that the receiving sonar transducer may be formed by any number of transducers, of any dimension, within the practical limits dictated by the carrier vehicle 11.

Figure 10:
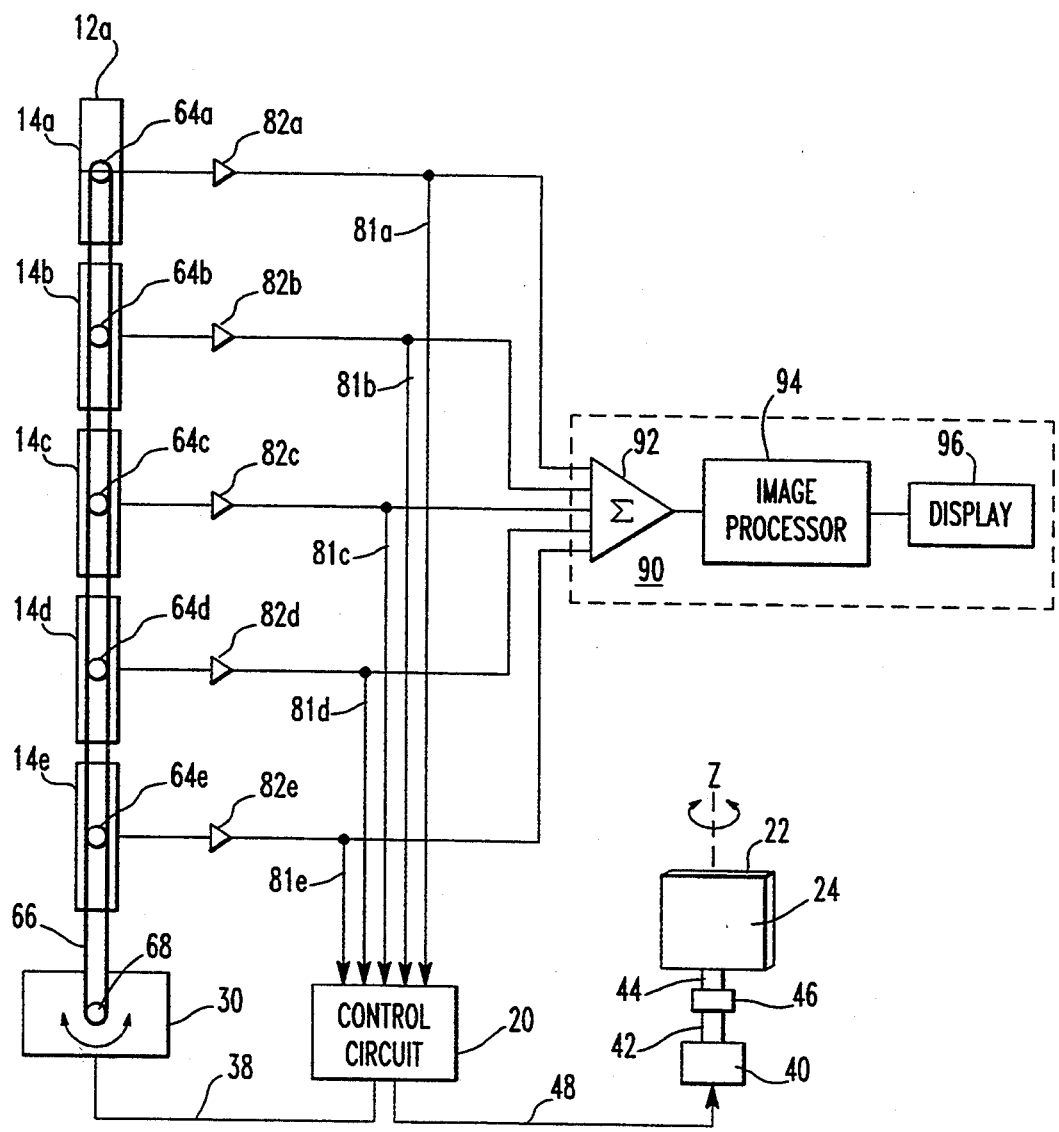
FIG. 10 is a block diagram illustrating exemplary control and receive circuitry for the spotlight-mode synthetic aperture side-look sonar system shown in FIG. 7, in accordance with the present invention.

As herein embodied and shown in the block diagram of FIG. 10, a synthetic aperture side-look sonar system, employing, for example, the receiving sonar transducer arrangement of FIG. 7, may include a receive circuit 90 for forming an image of the insonified target. A plurality of buffer amplifiers 82a–82e amplify electrical signals generated by the discrete receiving transducers 12a–12e in response to acoustic energy reflected from the target area. As the carrier vehicle 11 moves, control circuit 20 continuously senses the output of buffer amplifiers 82a–82e, via lines 81a–81e, to detect a target. In response to target detection, control circuit 20 activates the spotlight mode, causing motors 30 and 40 to rotate both the receiving transducers 12a–12e and the projecting transducer 22. An adder 92 then sums the signals generated by buffer amplifiers 82a–82e for each target sample, as the transducers 12a–12e are rotated to train receiving surfaces 14a–14e on the target. During the acquisition period, each of the target samples are stored in a storage device (not shown). After the receiving transducers 12a–12e have taken a complete set of target samples, an image processor 94 applies conventional beamforming techniques, such as the Fast Fourier Transform, to form an image of the target. A display device 96 then provides a visual representation of the resulting target image.

The method of the present invention, as herein embodied, provides a spotlight-mode synthetic aperture in a side-look sonar system having a receiving sonar transducer that includes a receiving surface for receiving acoustic energy reflected from a target area. The spotlight-mode synthetic aperture is provided by rotating the receiving sonar transducer, which may be transported by an underwater carrier vehicle. The rotation is controlled to direct the receiving surface toward the target area. In this manner, the receiving sonar transducer remains trained on a target as it moves relative to said target area. As the carrier vehicle moves, acoustic energy received by the receiving sonar transducer is sensed to detect a target.

In response to detection of a target, the spotlight mode is activated, causing rotation of the receiving sonar transducer to thereby direct the receiving surface of the receiving sonar transducer toward the target. The degree of rotation of the receiving transducer may be controlled, for example, as a function of the rate of movement of the receiving sonar transducer relative to said target. For advance detection of a target, prior to arrival of the carrier vehicle at the target area, the receiving transducer may be rotated such that the receiving surface is skewed somewhat forward relative to a direction of transducer movement.

The method of the present invention also may include the step of rotating a projecting sonar transducer provided in the side-look sonar system. The projecting sonar transducer includes a projecting surface for projecting acoustic energy toward said target area. To maintain insonification of a target as the carrier vehicle moves relative to the target, the rotation of the projecting sonar transducer is controlled to direct the projecting surface toward the target.

Having described the presently preferred embodiments of the invention, additional advantages and modifications will readily occur to those skilled in the art from consideration of the specification and practice of the invention disclosed herein. For example, one skilled in the art may recognize, without departing form the scope of the present invention, a variety of means suitable for implementing a mechanical drive for rotating the transducers, as herein disclosed. Further, it is not intended that the practice of the steps of the disclosed method be constrained by association with the specific structure described with respect to the exemplary embodiments of the disclosed system. Therefore, the specification and examples should be considered as exemplary only, with the true scope and spirit of the invention being indicated by the following claims.

I claim:

1. A synthetic aperture side-look sonar system for mounting to a carrier vehicle having a forward and rearward end in the direction of travel of the vehicle, the system comprising:
   at least one sonar transducer for rotatably mounting to the vehicle, the at least one transducer having a receiving surface for receiving acoustic energy reflected from a target area;
   a mechanical drive connected to the at least one transducer for rotating said receiving surface to receive energy reflected from a target area extending from a location forward of the forward end of the carrier vehicle to a location rearwardly of the carrier vehicle; and
   a control circuit for controlling the rotation of said at least one transducer by said mechanical drive to direct said receiving surface to receive the reflected energy from a corresponding geographical area during a change in the relative position of said target area and the carrier vehicle as said at least one receiving transducer moves relative to the geographical area.

2. The synthetic aperture side-look sonar system of claim 1, wherein said control circuit senses acoustic energy received by said receiving surface to detect a target in said target area, and, in response to detection of said target, activates said mechanical drive to rotate said at least one sonar transducer toward said target as said receiving sonar transducer moves relative to said target.

3. The synthetic aperture side-look of claim 2, wherein said control circuit controls the degree of rotation of said at least one sonar transducer as a function of the rate of movement of said receiving surface relative to said target.

4. The synthetic aperture side-look sonar system of claim 2, wherein said receiving surface of said at least one sonar transducer is rotated to the position to receive energy reflected from a target area forward of the forward end of the carrier vehicle at times when no target is detected in the target area.

5. The synthetic aperture side-look sonar system of claim 1, wherein said at least one sonar transducer comprises a plurality of sonar transducers.

6. The synthetic aperture side-look sonar system of claim 5, wherein the respective plurality of receiving surfaces of said plurality of sonar transducers are oriented substantially parallel to one another.

7. The synthetic aperture side-look sonar system of claim 5, wherein said plurality of sonar transducer receiving surfaces are coupled to one another to form a composite transducer, and said mechanical drive rotates said composite transducer.

8. The synthetic aperture side-look sonar system of claim 7, wherein said control circuit senses said acoustic energy received by said plurality of sonar transducers forming said composite receiving sonar transducer to detect a target in said target area, and, in response to detection of said target, activates said mechanical drive to rotate said composite receiving sonar transducer, thereby directing the respective receiving surfaces of said plurality of sonar transducers toward said target as said composite receiving sonar transducer moves relative to said target.

9. The synthetic aperture side-look sonar system of claim 8, wherein said control circuit controls the degree of rotation of said composite receiving sonar transducer by said mechanical drive as a function of the rate of movement of said composite transducer relative to said target.

10. The synthetic aperture side-look sonar system of claim 5, wherein said mechanical drive includes a plurality of drive units, each of said drive units rotating a respective one of said plurality of sonar transducers.

11. The synthetic aperture side-look sonar system of claim 10, wherein said control circuit senses said acoustic energy received by said plurality of sonar transducers to detect a target in said target area, and, in response to detection of said target, activates said drive units to rotate said plurality of sonar transducers, thereby directing the respective receiving surfaces of said plurality of sonar transducers toward said target as said plurality of sonar transducers moves relative to said target.

12. The synthetic aperture side-look sonar system of claim 11, wherein, upon activation of said drive units, said control circuit controls the degree of rotation of said plurality of sonar transducers by said drive units as a function of the rate of movement of said plurality of sonar transducers relative to said target.

13. The synthetic aperture side-look sonar system of claim 5, wherein each of said plurality of sonar transducers includes a mounting shaft, and said mechanical drive includes a drive belt coupled to each of the respective mounting shafts of said plurality of sonar transducers, and a motor for driving said drive belts to rotate all of said plurality of sonar transducers.

14. The synthetic aperture side-look sonar system of claim 13, wherein said control circuit senses said acoustic energy received by said plurality of sonar transducers to detect a target in said target area, and, in response to detection of said target, activates said mechanical drive to rotate said plurality of sonar transducers, thereby directing the respective receiving surfaces of said plurality of sonar transducers toward said target as said plurality of sonar transducers moves relative to said target.

15. The synthetic aperture side-look sonar system of claim 14, wherein, after activating said mechanical drive, said control circuit controls the degree of rotation of said plurality of sonar transducers by said mechanical drive as a function of the rate of movement of said plurality of sonar transducers relative to said target.

16. The synthetic aperture side-look sonar system of claim 1, further comprising:
a projecting sonar transducer having a projecting surface for projecting acoustic energy toward said target area; and
a second mechanical drive for rotating said projecting sonar transducer, wherein
said control circuit controls the rotation of said projecting sonar transducer by said second mechanical drive to direct said projecting surface of said projecting sonar transducer toward said target area as said projecting sonar transducer moves relative to said target area.

17. The synthetic aperture side-look sonar system of claim 16, wherein said control circuit senses said acoustic energy received by said receiver sonar transducer to detect a target in said target area, and, in response to detection of said target, activates said second mechanical drive to rotate said projecting sonar transducer, thereby directing said projecting surface of said projecting sonar transducer toward said target as said projecting sonar transducer moves relative to said target.

18. The synthetic aperture side-look sonar system of claim 17, wherein, after activating said second mechanical drive, said control circuit controls the degree of rotation of said projecting sonar transducer by said second mechanical drive as a function of the rate of movement of said projecting sonar transducer relative to said target.

19. The synthetic aperture side-look sonar system of claim 17, wherein, before said control circuit activates said second mechanical drive, said projecting sonar transducer is oriented such that said projecting surface of said projecting sonar transducer is directed forward relative to a direction of movement of said projecting sonar transducer.

20. The synthetic aperture side-look sonar system of claim 1, wherein said mechanical drive rotates said at least one transducer about an axis substantially perpendicular to a vertical side plane of said underwater carrier vehicle.

21. A method for providing a synthetic aperture in a side-look sonar system mounted on a carrier vehicle and having a sonar transducer that includes a surface for receiving acoustic energy reflected from a target area, said method comprising the steps of:
rotating said receiving surface of the sonar transducer to receive reflected energy in a target area extending from forward of the carrier vehicle to a location rearwardly of the carrier vehicle; and
controlling the rotation of said transducer to direct said receiving surface toward a corresponding fixed geographic area as said transducer moves relative to said target area.

22. The method of claim 21, further comprising the steps of:
sensing acoustic energy received by said receiving to detect a target in said target area; and
activating, in response to detection of said target, the rotation of said receiving sonar transducer, thereby directing said receiving surface of said receiving sonar transducer toward said target as said receiving sonar transducer moves relative to said target.

23. The method of claim 22, further comprising the step of:
controlling the degree of rotation of said transducer as a function of the rate of movement of said transducer relative to said target.

24. The method of claim 22, further comprising the step of:
rotating said receiving sonar transducer, before said target is detected, such that said receiving surface of said transducer is directed forward relative to a direction of movement of said receiving sonar transducer.

25. The method of claim 21, wherein said side-look sonar system includes a projecting sonar transducer that includes a projecting surface for projecting acoustic energy toward said target area, and further comprising the steps of:
rotating said projecting sonar transducer; and
controlling the rotation of said projecting sonar transducer to direct said projecting surface of said projecting sonar transducer toward said target area as said projecting sonar transducer moves relative to said target area.

26. The method of claim 21, wherein said step of rotating said receiving sonar transducer includes rotating said receiving sonar transducer about an axis substantially perpendicular to a vertical sideplane of said carrier vehicle.

* * * * *